United States Patent [19]
Kaneko

[11] Patent Number: 5,943,353
[45] Date of Patent: Aug. 24, 1999

[54] LASER LIGHT SOURCE APPARATUS

[75] Inventor: Kenji Kaneko, Tokyo, Japan

[73] Assignee: Sony Corporation, Tokyo, Japan

[21] Appl. No.: 08/880,785

[22] Filed: Jun. 23, 1997

[30] Foreign Application Priority Data

Jul. 1, 1996 [JP] Japan ..................................... 8-190123

[51] Int. Cl.$^6$ ...................................................... H01S 3/04
[52] U.S. Cl. .................................. 372/34; 372/22; 372/97
[58] Field of Search ................................. 372/34, 22, 36, 372/97

[56] References Cited

U.S. PATENT DOCUMENTS

| | | | |
|---|---|---|---|
| 4,809,291 | 2/1989 | Byer et al. | 372/34 |
| 5,267,252 | 11/1993 | Amano | 372/34 |
| 5,341,388 | 8/1994 | Masuda et al. | 372/34 |
| 5,446,750 | 8/1995 | Ohtsuka et al. | 372/34 |
| 5,495,489 | 2/1996 | Lee et al. | 372/34 |
| 5,854,802 | 12/1998 | Jin et al. | 372/34 |

*Primary Examiner*—Leon Scott, Jr.
*Attorney, Agent, or Firm*—Limbach & Limbach LLP; Seong-Kun Oh

[57] ABSTRACT

A laser light source apparatus and a control method for automatically sitting the temperature of a KTP crystal to an optimal temperature, and to follow up in variations of the optimal temperature. A predetermined temperature step is periodically added to a temperature corresponding to a reference potential, the addition of the temperature step is stopped when a temperature at which the UV laser output is substantially maximized, and a temperature step smaller than the temperature step $\Delta T$ is successively subtracted from the temperature Tc, thereby automatically setting the KTP crystal temperature to the optimal temperature. Also, the difference between the two values of the UV laser output before and after each step addition of the temperature step is calculated and step subtraction is started when the difference becomes reversed in polarity, thus controlling the KTP crystal temperature so that the UV laser output is always maintained at the maximum. Therefore, the control system can follow up a variation in the optimal temperature due to a change in temperature characteristic of the KTP crystal.

6 Claims, 11 Drawing Sheets

LASER LIGHT SOURCE APPARATUS

BACKGROUND OF THE INVENTION

1. Field of the Invention

The present invention relates to a laser light source apparatus and a method of controlling the laser light source apparatus and, more particularly, to a laser light source apparatus and method suitable for optomagnetic recording.

2. Description of the Related Art

A laser light source apparatus is known which causes second harmonic oscillation (SHG) of, for example, green laser light or fourth harmonic oscillation (FHG) of, for example, ultraviolet laser light (referred to as UV laser, hereinafter) by wavelength-converting long-wavelength laser light with a wavelength conversion element formed of a nonlinear optical crystal.

FIG. 1 is a block diagram schematically showing the configuration of a laser light source apparatus of this kind. The laser light source apparatus has a green resonator unit 1, in which long-wavelength laser light is introduced into a wavelength conversion element formed of a nonlinear optical crystal, and green laser light G is output by resonance of the introduced laser light with the wavelength conversion element. The green resonator unit 1 has constituents 1a to 1d and 1f.

The constituent 1a is an exciting laser device for emitting exciting laser light. The constituent 1b is an exciting laser control section for controlling the light emitting operation of the exciting laser device 1a. The constituent 1c is a green resonator consisting of a light emitting element for emitting YAG laser light according to the exciting laser light, a nonlinear optical KTP crystal element (hereinafter referred to as "KTP crystal") for wavelength-converting the YAG laser light, and a resonance optical system.

The constituents 1d and 1f are temperature control sections for controlling the resonance optical system and the KTP crystal.

The laser light source apparatus also has an UV resonator unit 2 for causing resonance of the green laser light emitted from the above-described green resonator section 1 to cause fourth harmonic oscillation (FHG) of UV laser light. The UV resonator unit 2 has a phase modulator 2a, a green detector 2b, a locking control section 2c, a BBO (β-BaB$_2$O4) element 2d, an acousto-optic modulator (AOM) 2e, an AOM control section 2f and an optical element such as a half mirror.

In order to obtain high-power stable UV laser light by the laser light source apparatus arranged as described above, it is necessary to maintain the KTP (KTiPO$_4$) crystal at an optimal operating temperature.

The KTP crystal has such a temperature characteristic that the UV laser light output changes as the crystal temperature changes from 42.4° C. to 43.1° C., as shown in FIG. 2, for example. In such a case, an optimal temperature of 42.8° C. exists, at which the output is maximized.

Conventionally, the KTP temperature control section 1f performs a feedback temperature control for maintaining such an optimal crystal temperature. That is, as shown in FIG. 3, a reference potential REF is applied to the noninverting input terminal of an error amplifier 10 formed of an operational amplifier or the like while the output from a thermistor 13 described below is supplied to the inverting input terminal of the error amplifier 10. The error amplifier 10 generates an output signal according to the potential difference between the reference potential REF and the output of the thermistor 13.

The output driver 11 generates a drive signal for cool-driving or heat-driving a Peltier element 12 according to the output of the error amplifier 10. The Peltier element 12 electronically cools or heats the KTP crystal according to the drive signal generated by the output driver 11. The resistance of the thermistor 13 changes according to the temperature of the KTP crystal. From the thermistor 13, the output voltage corresponding to a measured value of the KTP crystal temperature is supplied to the inverting input terminal of the error amplifier 10.

If the reference potential REF is set to the value corresponding to the target temperature, the KTP temperature control section 1f performs feedback control of making the Peltier element 12 electronically cool and heat the KTP crystal so that the KTP crystal is maintained at the target temperature.

The above-described conventional laser light source apparatus entails problems described below.

1) The KTP temperature control section 1f performs feedback temperature control such as to constantly maintain the KTP crystal at a certain temperature. However, it is known that the optimal temperature of the KTP crystal is not a fixed value; it varies depending upon environmental conditions, such as room temperature and humidity, and upon the temperature characteristic of the KTP crystal, which is not stable. The conventional KTP temperature control section 1f cannot follow up such variation in optimal temperature, so that the UV laser output is unstable.

2) As can be understood from the temperature characteristic of the KTP crystal shown in FIG. 2, the KTP crystal temperature must be changed a 0.1° or smaller step to detect the optimal temperature. Moreover, this is done manually according to the conventional art. Such a manual operation is very difficult to perform.

3) In the conventional laser light source apparatus, the operations of the exciting laser control section 1b, the resonator temperature control section 1d, the locking control section 2c and the AOM control section 2f are respectively controlled as well as that of the KTP temperature control section 1f. Therefore, there is a need for efficient optimal control of the entire light source system.

SUMMARY OF THE INVENTION

In view of the above-described circumstances, an object of the present invention is to provide a laser light source apparatus in which the KTP crystal temperature can be automatically set to the temperature at which the UV laser output is maximized, in which variations in the optimal temperature can be followed up, and in which the entire apparatus system can be controlled efficiently and optimally, and to provide a method for such optimal control of the laser light source apparatus.

To achieve the above-described object, according to one aspect of the present invention, there is provided a laser light source apparatus comprising a first resonator unit for emitting a second harmonic light obtained by a wavelength-converting solid state laser light with a nonlinear optical crystal, and a second resonator unit for emitting a fourth harmonic light by wavelength-converting the second harmonic light supplied from the first resonator unit. The first resonator unit has feedback control means for controlling the temperature of the nonlinear optical crystal according to a measured value of the temperature of the nonlinear optical crystal and a temperature command value, detection means for detecting an optimal temperature of the nonlinear optical crystal, and variation follow-up means for supplying a temperature command value to the feedback control means so as to follow up a variation in the optimal temperature obtained by the detection means.

In the above-described laser light source apparatus, the detection may be arranged to periodically add a predetermined temperature step ΔT to a temperature Ta, to stop addition of the temperature step ΔT at a temperature Tc (Ta<Tc) at which the fourth harmonic light output starts decreasing after reaching a maximum value, and to subtract a temperature step Δt smaller than the temperature step ΔT from the temperature Tc in order to detect the optimal temperature at which the fourth harmonic light output is maximized again.

In the above-described laser light source apparatus, the variation follow-up means may be arranged to calculate the difference between the two values of the fourth harmonic light output before and after each addition of the temperature step ΔT, and to generate a temperature command value to start subtraction of the temperature step Δt to maintain the peak of the fourth harmonic light output when the difference becomes reversed in polarity.

According to another aspect of the present invention, there is provided a method of controlling a laser light source apparatus, comprising a first step of emitting a second harmonic light obtained by wavelength-converting a solid state laser light with a nonlinear optical crystal, and a second step of emitting a fourth harmonic light by wavelength-converting the second harmonic light obtained by the first step. The first step includes feedback control processing for controlling the temperature of the nonlinear optical crystal according to a measured value of the temperature of the nonlinear optical crystal and a temperature command value, detection processing for detecting an optimal temperature of the nonlinear optical crystal, and variation follow-up processing for supplying a temperature command value to the feedback control step so as to follow up a variation in the optimal temperature obtained by the detection step.

In the above-described method, the detection processing may be such that a predetermined temperature step ΔT is periodically added to a temperature Ta, the addition of the temperature step ΔT being stopped at a temperature Tc (Ta<Tc) at which the fourth harmonic light output is substantially maximized, and a temperature step Δt smaller than the temperature step ΔT being successively subtracted from the temperature Tc in order to detect the optimal temperature at which the fourth harmonic light output is maximized.

In the above-described method, the variation follow-up processing may be such that the difference between the two values of the fourth harmonic light output before and after each addition of the temperature step ΔT is calculated and a temperature command value for starting subtraction of the temperature step Δt for maintaining the peak of the fourth harmonic light output is generated when the difference becomes reversed in polarity.

According to the present invention, when the optimal temperature of the nonlinear optical crystal is detected by the detection means, the variation follow-up means supplies a temperature command value to the feedback control means so as to follow up a variation in the optimal temperature obtained by the detection means. Then, the feedback control means controls the temperature of the nonlinear optical crystal according to the measured temperature of the nonlinear optical crystal and the temperature command value.

In this manner, the nonlinear crystal temperature can be automatically set to the temperature at which the UV laser output is maximized. Moreover, the control system can follow up a variation in the optimal temperature, and the entire apparatus system can be controlled efficiently and optimally.

The laser light source apparatus of the present invention can be used in a laser printer, laser measurement, optical communication and the like as well as in apparatuses for optical recording or optomagnetic recording.

DESCRIPTION OF THE PREFERRED EMBODIMENT

A. Configuration of Embodiment

Figure 3:
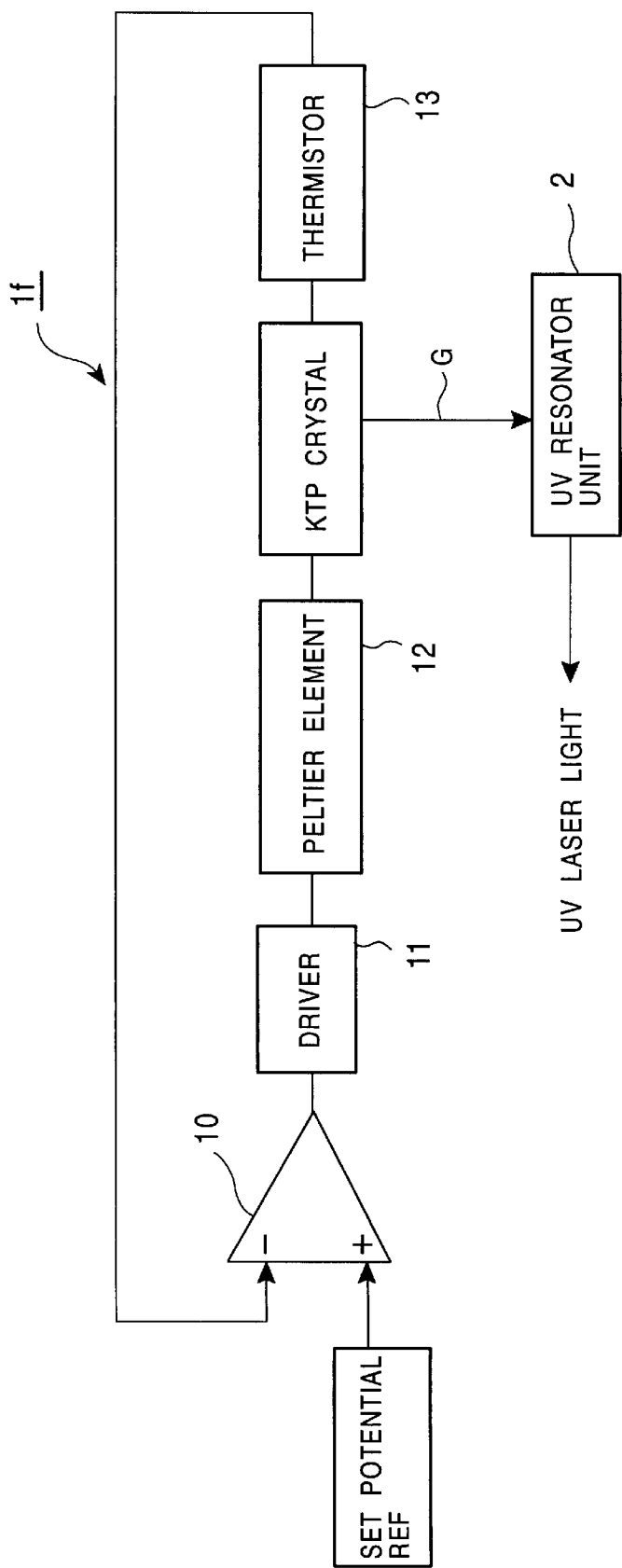
FIG. 3 is a block diagram showing the configuration of a KTP temperature control section 1f of the conventional apparatus.
Figure 4:
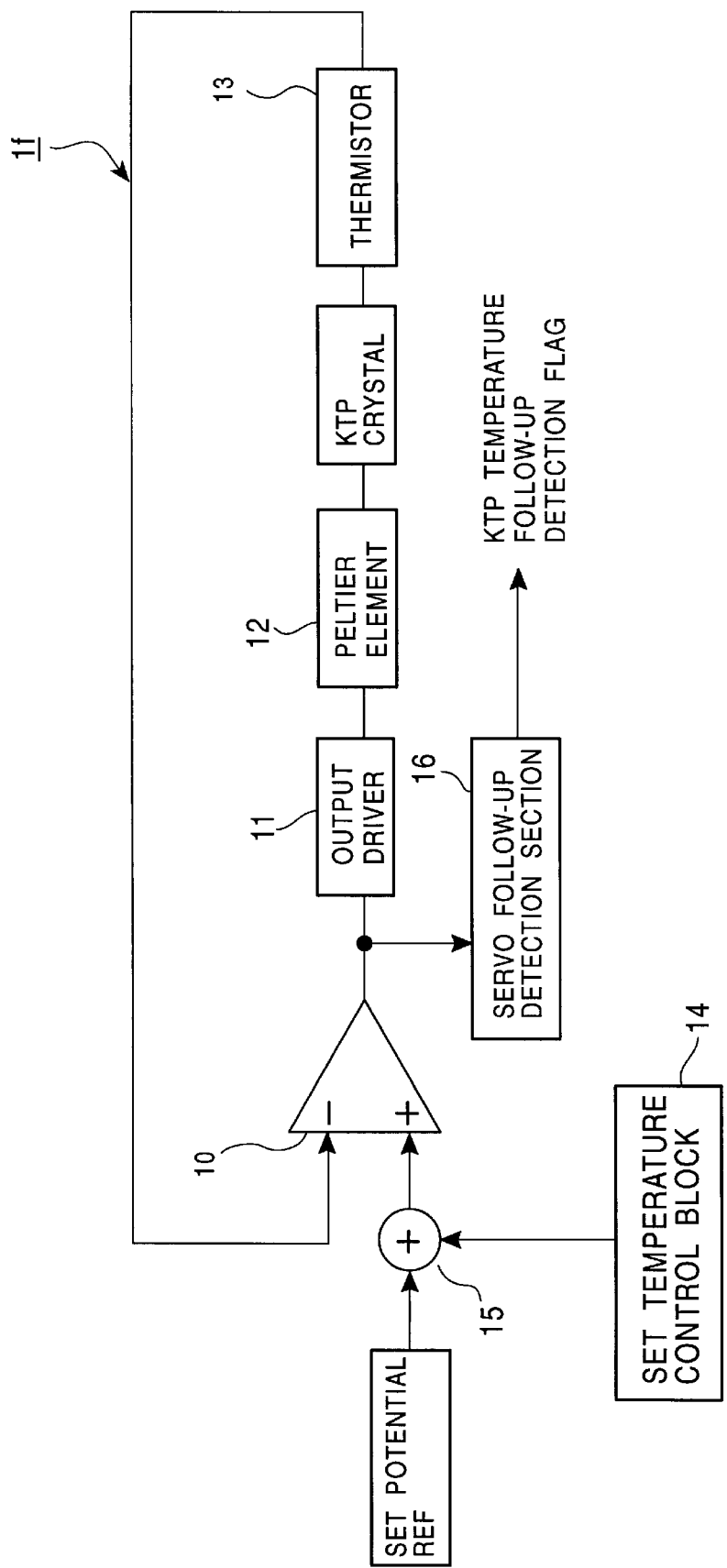
FIG. 4 is a block diagram showing the configuration of a KTP temperature control section 1f of an embodiment of the present invention.

FIG. 4 is a block diagram of a KTP (nonlinear optical crystal) temperature control section 1f which represents an embodiment of the present invention. Components of this KTP temperature control section corresponding to those in the conventional arrangement shown in FIG. 3 are indicated by the same reference numerals, and the description of them will not be repeated.

Figure 7:
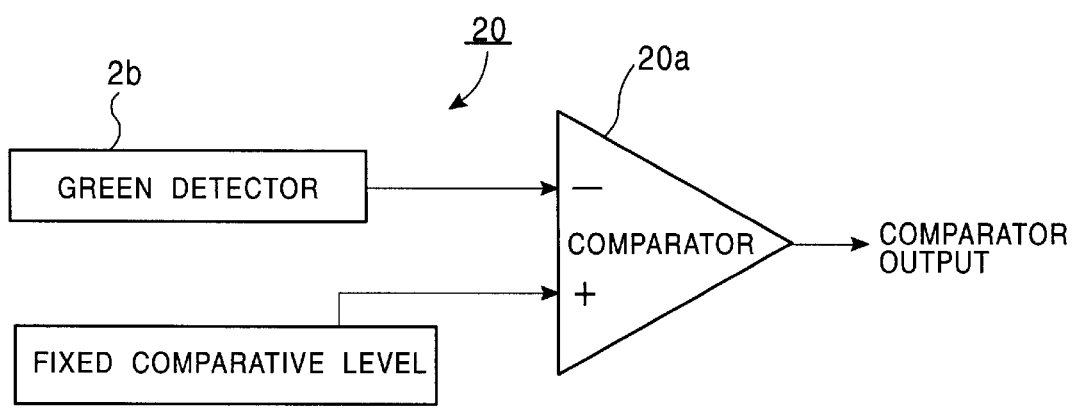
FIG. 7 is a block diagram showing the configuration of a comparison circuit 20 used in the optimal KTP temperature automatic setting method.

The KTP temperature control section 1f of this embodiment is arranged so as to be capable of automatically setting the temperature of the KTP crystal to the optimal temperature and following up a variation in the optimal temperature due to a change in temperature characteristic of the KTP crystal. This KTP temperature control section 1f differs from the conventional one shown in FIG. 3 in that components 14 to 16 are provided and that the optimal KTP temperature is detected by a comparison circuit 20 (FIG. 7) described below. A description will be made with respect to these points.

A set temperature control block 14 shown in FIG. 4 generates a step signal ΔT of a predetermined temperature width by which a set temperature is incremented or decremented at regular intervals. An adder 15 adds the temperature step signal ΔT output from the set temperature control block 14 and the above-mentioned reference potential REF together and outputs the result of this addition. A servo follow-up detection section 16 generates a KTP temperature follow-up detection flag each time the output of the error amplifier 10 reaches the set temperature.

B. Optimal KTP Crystal Temperature Automatic Setting Method

Figure 5:
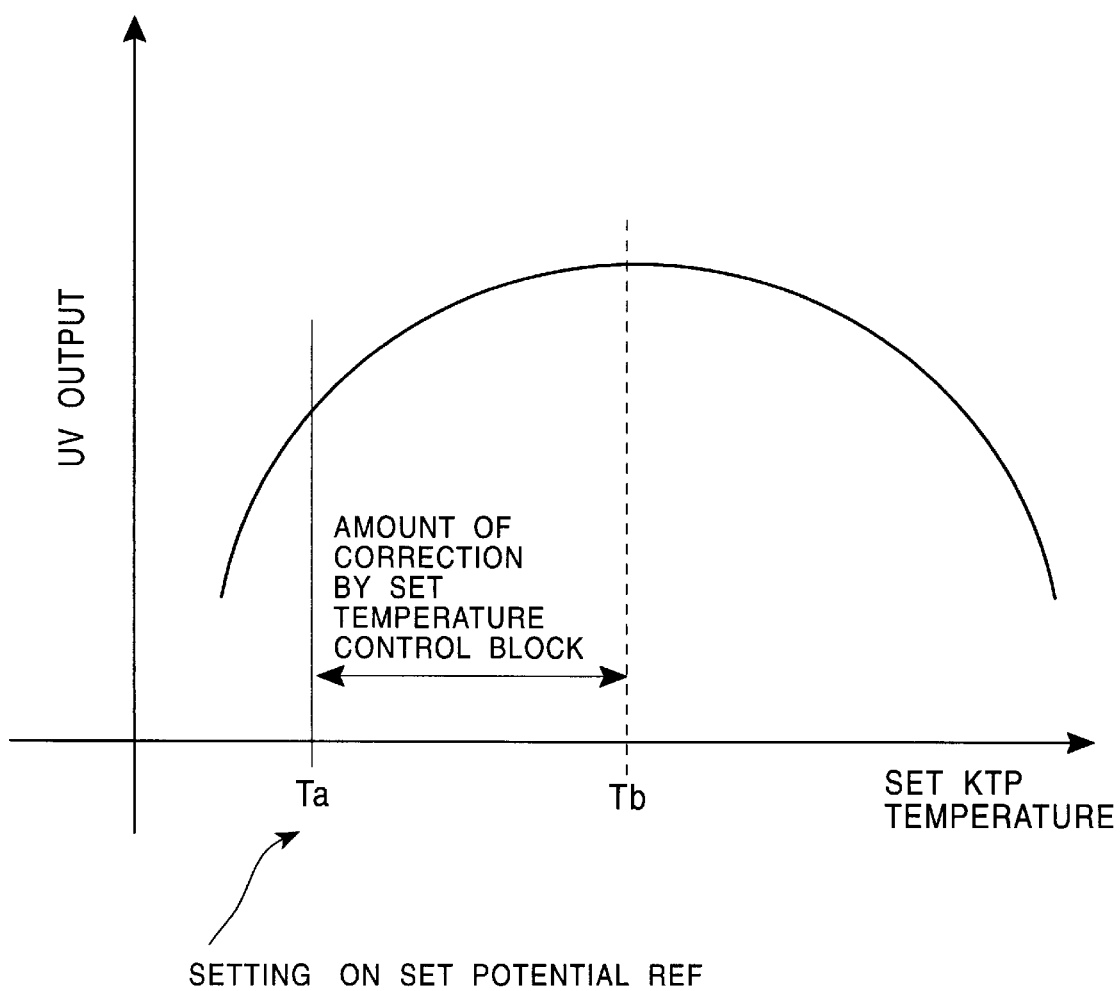
FIG. 5 is a diagram for explaining an optimal KTP temperature automatic setting method for use with the arrangement shown in FIG. 4.
Figure 6:
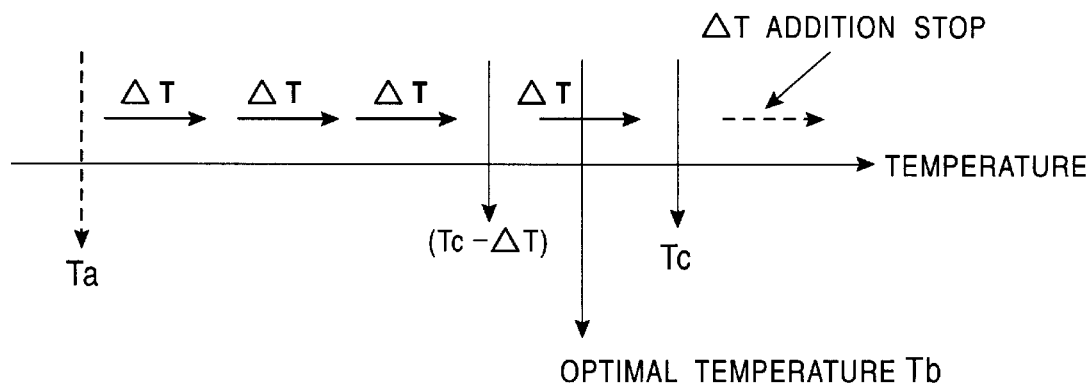
FIG. 6 is a diagram for explaining the addition of a temperature step ΔT in the optimal KTP temperature automatic setting method.

A method of automatically setting the temperature of the KTP crystal to the optimal temperature in the above-described arrangement will next be described. The relationship between the above-mentioned reference potential REF and the operation of the set temperature control block is such that, as shown in FIG. 5, the difference between a temperature Ta corresponding to the reference potential REF and an optimal KTP temperature Tb is corrected by the set temperature control block 14. That is, the set temperature control block 14 increases the set temperature by a ΔT step at regular intervals, as shown in FIG. 6.

While the set temperature is being increased, the time when the temperature of the KTP crystal becomes equal to the optimal temperature Tb is detected by the comparison circuit 20. The comparison circuit 20 is formed of a comparator 20a which is supplied with a predetermined fixed comparative level at its noninverting input terminal and with the output of the green detector 2b (see FIG. 1) at its inverting input terminal. When the UV laser output is maximized, the comparator 20a outputs a high level. At this time, the temperature of the KTP crystal becomes equal to the optimal temperature Tb.

That is, when the UV laser output is at the maximum, the output power of green laser light is accumulated in the UV resonator unit 2 (see FIG. 1) and, therefore, the output level of the green detector 2b becomes closer to "0".

Therefore, the fixed comparative level supplied to the noninverting input terminal of the comparator 20a is set to a value in the vicinity of the zero level to enable the comparator 20a to generate an output at high level when the UV laser output is substantially maximized.

When the time point at which the KTP crystal temperature becomes approximately equal to the optimal temperature Tb is detected by monitoring the output of the comparator 20a, addition of step signal ΔT is stopped. At this time, because of response delay of the KTP temperature control section 1f, the set temperature of the KTP crystal becomes higher than the optimal temperature Tb to which it is to be set.

If the time interval of step addition is set so as to be sufficiently longer than the response delay, the range from (Tc−ΔT) to Tc includes the optimal temperature Tb. Temperature Tc represents the temperature corresponding to the moment at which step addition is stopped.

Figure 8:
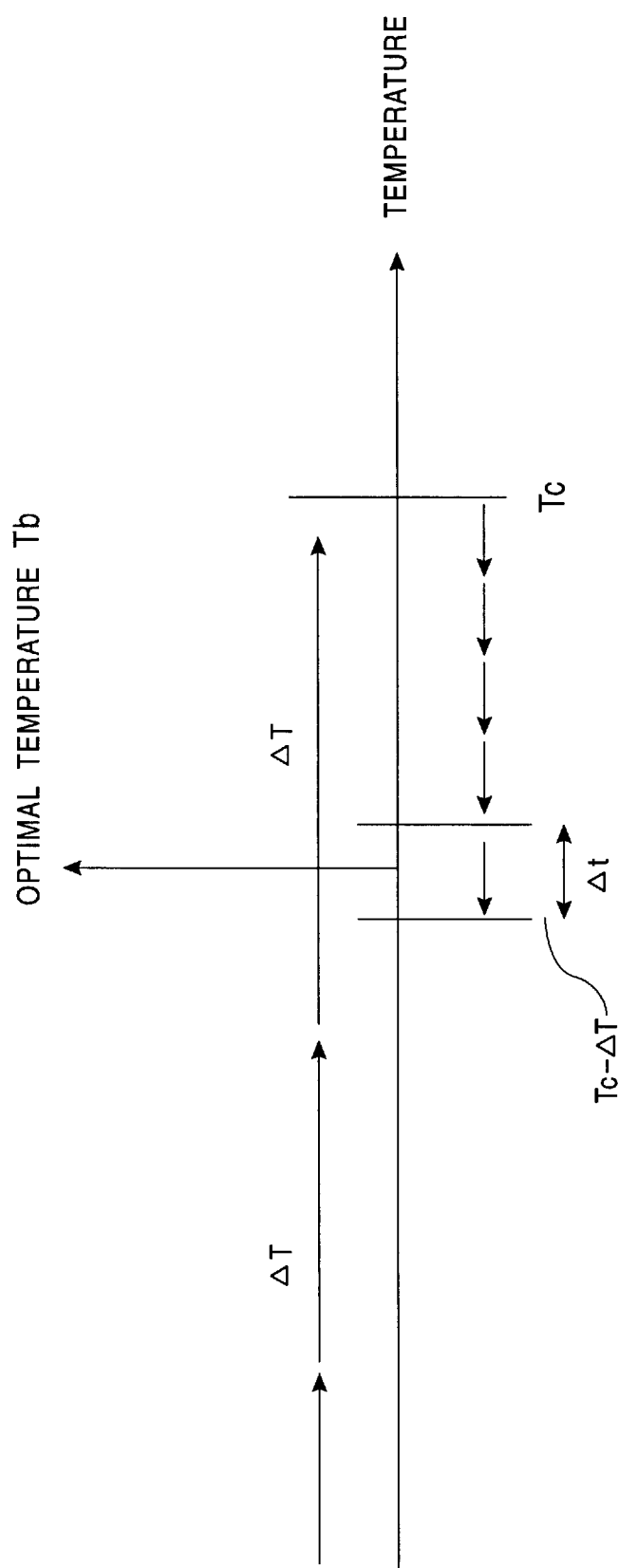
FIG. 8 is a diagram for explaining the subtraction of a temperature step Δt in the optimal KTP temperature automatic setting method.

Next, the set temperature control block 14 successively subtracts a smaller step width Δt from the temperature Tc, as shown in FIG. 8. The set KTP temperature is thereby reduced from Tc to Tc−Δt, to Tc−2Δt, . . . . While the set temperature is being changed in this manner, the output of the comparison circuit 20 (see FIG. 7) is monitored to detect the time at which the temperature of the KTP crystal becomes equal to the optimal temperature Tb.

Strictly speaking, an error of Δt at the maximum occurs in setting the KTP temperature to the optimal temperature Tb by the above-described method. However, this is not a consideration because the set temperature can be converged to the optimal temperature Tb if at that point the control proceeds into a mode SERV_MODE described below.

Figure 9:
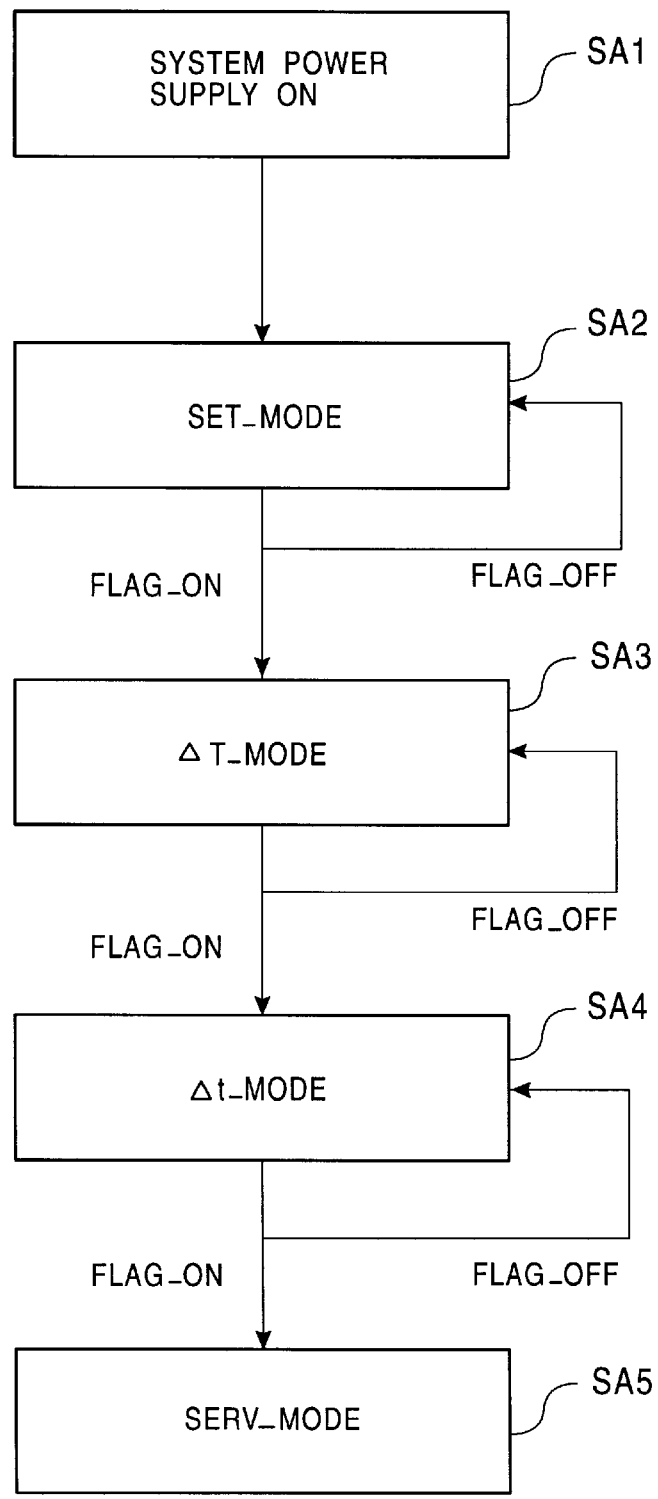
FIG. 9 is a flowchart of optimal temperature automatic setting process to which the optimal KTP temperature automatic setting method is applied.

The procedure of the above-described KTP crystal optimal temperature automatic setting can be shown by the flowchart of FIG. 9.

When the power supply for the system is turned on in step SA1, each section of the apparatus is initialized. By this initialization, reference potential REF is set.

Next, in step SA2, processing in mode SET_MODE for controlling the KTP crystal temperature until the KTP crystal temperature becomes equal to the set temperature Ta corresponding to the reference potential REF is executed. In mode SET_MODE, the set temperature control block 14 (see FIG. 4) outputs zero.

When the KTP crystal temperature becomes equal to the set temperature Ta, the servo follow-up detection section 16 sets the detection flag to "FLAG ON". With this FLAG_ON used as a trigger, the set temperature control block 14 (see FIG. 4) advances the process to step SA3 to start processing in mode ΔT_MODE.

This processing in mode ΔT_MODE is processing of increasing the set temperature ΔT step at regular intervals, as described above. In this mode, the output of the comparison circuit 20 is monitored and the servo follow-up detection section 16 sets the detection flag to "FLAG_ON" when the comparator 20a generates the output of high level, i.e., when the set temperature Tc is reached. The process advances thereby to the next step SA4.

In step SA4, the step width is reduced to Δt and is successively subtracted from the temperature Tc. Also in this mode, the output of the comparison circuit 20 is monitored and the servo follow-up detection section 16 sets the detection flag to "FLAG_ON" when the comparator 20a generates the output of high level, i.e., when the KTP temperature becomes approximately equal to the optimal temperature Tb. The process advances thereby to the next step SA5 to start processing in mode SERV_MODE described below.

In mode SERV_MODE, the system for controlling the KTP crystal temperature follows up the optimal temperature Tb to cancel temperature variations due to changes in environmental conditions such as room temperature and humidity and in KTP crystal temperature characteristic.

According to the optimal temperature setting method of this embodiment, as described above, the KTP crystal temperature can be automatically set to the temperature at which the UV laser output is maximized, and the time required for convergence to the vicinity of the optimal temperature Tb and the temperature setting accuracy can be freely controlled by setting the temperature control step widths ΔT and Δt to predetermined values according to the characteristics of the control system.

C. Optimal KTP Crystal Temperature Follow-up Method

An optimal temperature follow-up method for processing in the above-mentioned mode SERV_MODE will be described with reference to FIG. 10.

Figure 10A:
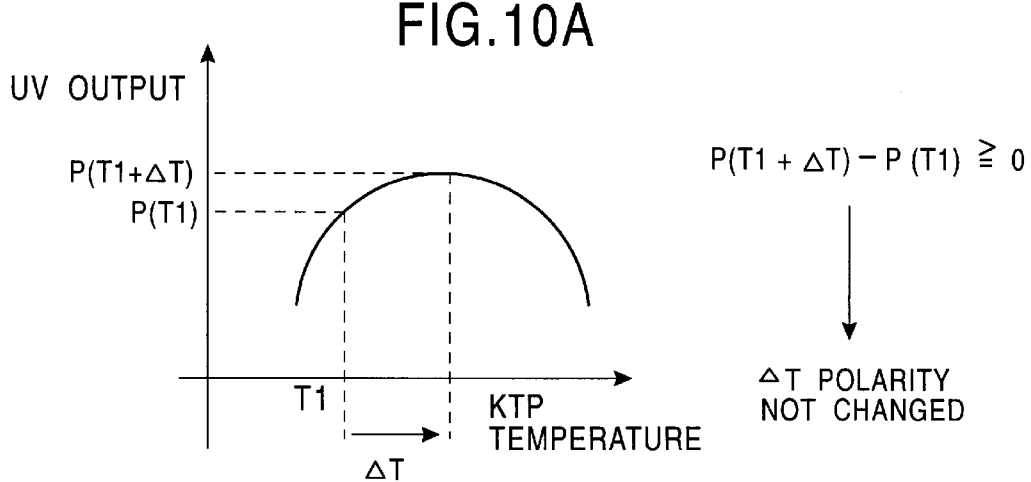
FIGS. 10A–10C are diagrams for explaining the optimal KTP crystal temperature follow-up method used in the embodiment of the present invention.

It is assumed that the temperature-output relationship is as shown in FIG. 10A when the operation is in the above-described mode ΔT_MODE. That is, the UV output at a set temperature T1 is P(T1). When the set temperature becomes (T1+ΔT) by the subsequent step addition, the UV output becomes P(T1+ΔT). In this case, P(T1+ΔT)−P(T1)≧0; the UV output curve has no peak through step ΔT and shows a monatomic increase in the UV output.

Figure 10B:
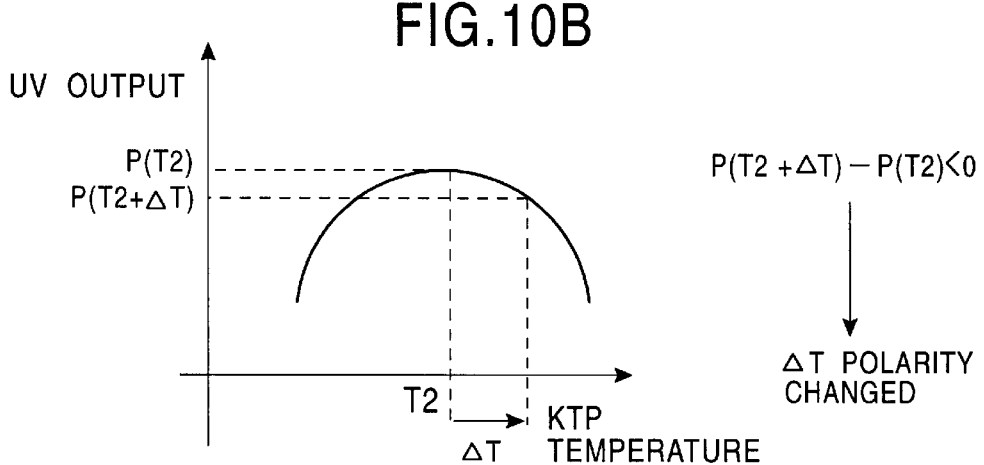

Then, as shown in FIG. 10B, the UV output at a set temperature T2 is P(T2). When the set temperature becomes (T2+ΔT) by the subsequent step addition, the UV output becomes P(T2+ΔT).

In this case, P(T2+ΔT)−P(T2)<0; the UV output curve has a peak in the range of step ΔT. Then, ΔT is reversed in polarity and step subtraction is started.

Figure 10C:
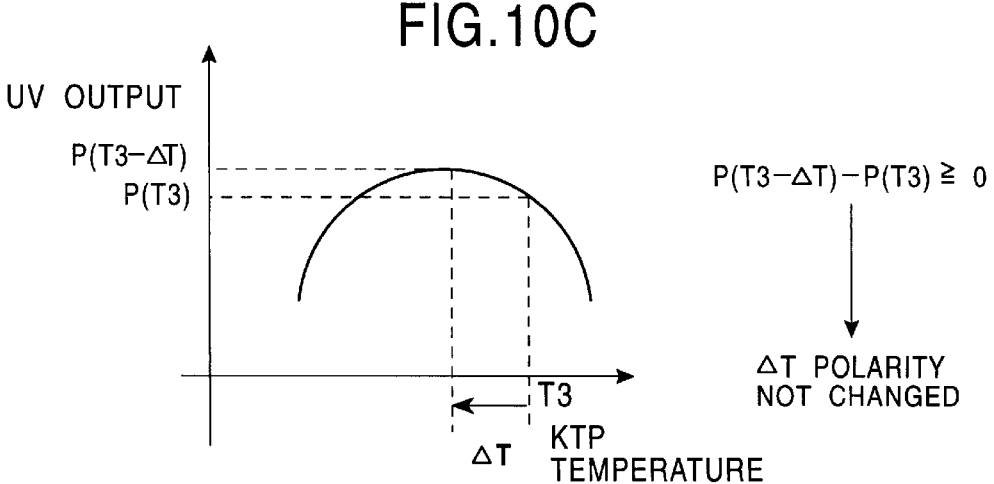

That is, if, as shown in FIG. 10c, the set temperature (T2+ΔT) is T3 and the corresponding UV output is P(T3), then the set temperature becomes (T3−ΔT) by step subtraction. The UV output at this time is P(T3−ΔT). In this case, P(T3−ΔT)−P(T3)≧0; the UV output curve has no peak through step ΔT and shows a monotonic increase in the UV output.

Subsequently, the above-described process is repeated to enable the set temperature to converge to the temperature corresponding to the peak of the UV output.

Figure 1:
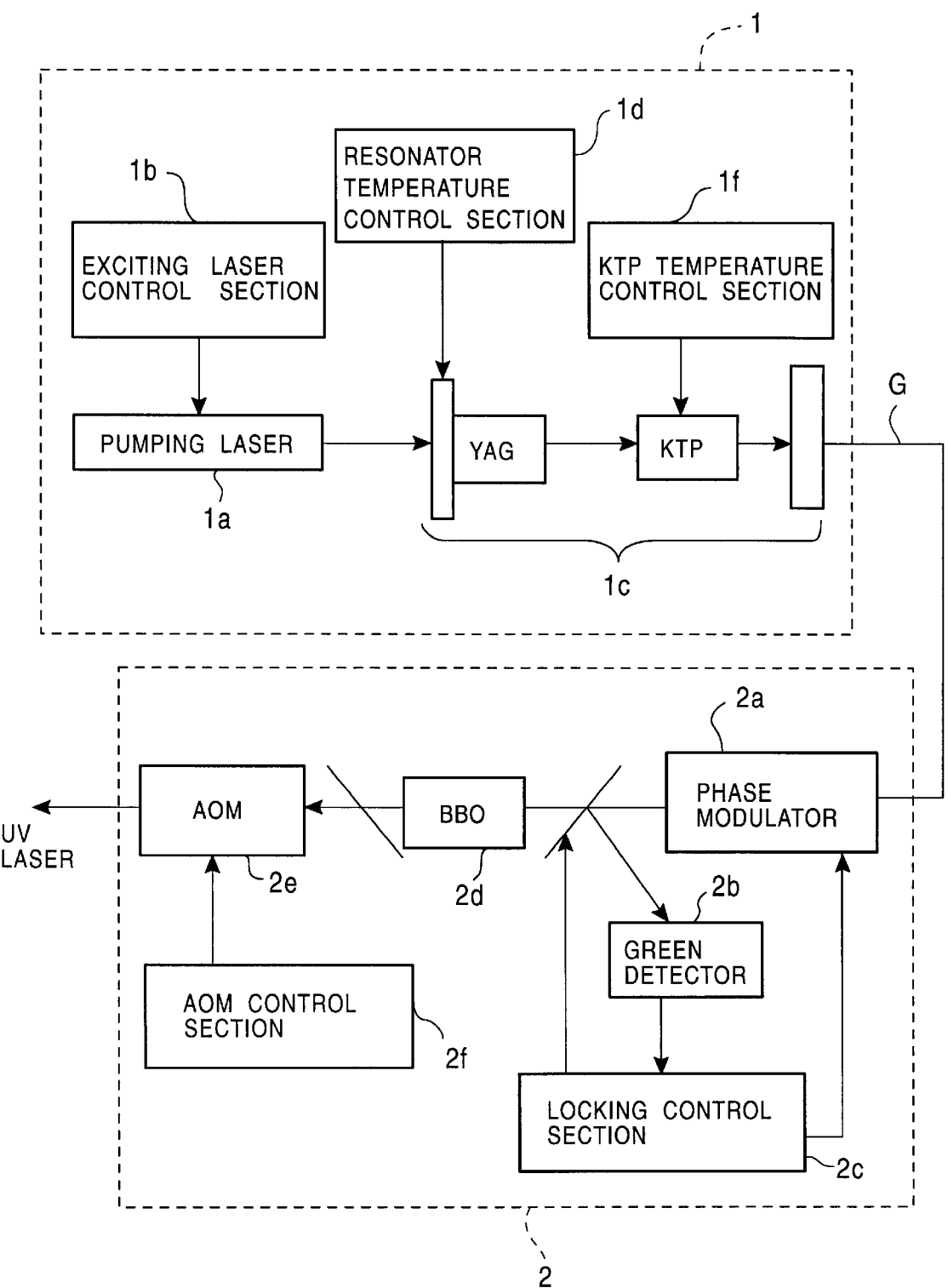
FIG. 1 is a block diagram showing the overall configuration of a conventional laser light source apparatus.
Figure 2:
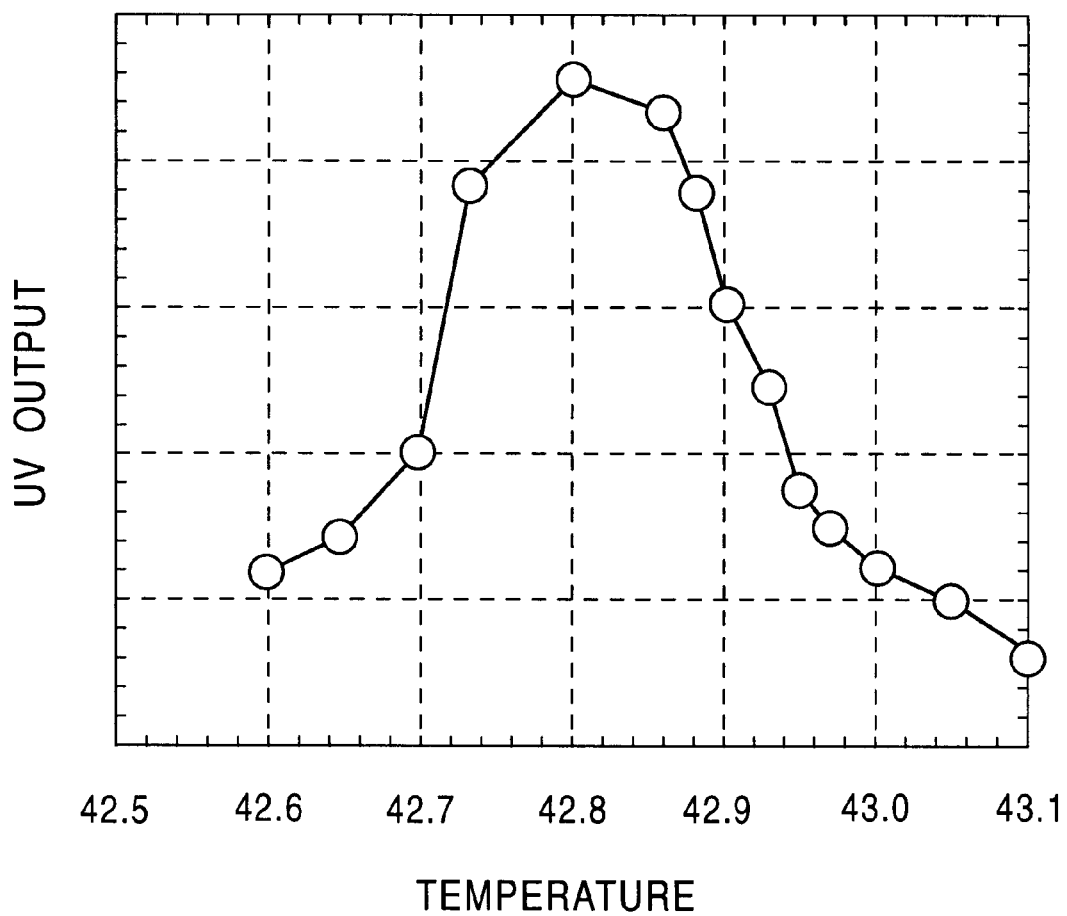
FIG. 2 is a diagram showing an example of a temperature characteristic of a KTP crystal.

Since the output of the green detector 2b shown in FIG. 1 equivalently represents the UV output, the UV laser output power can be measured by monitoring the output value of the green detector 2b.

Thus, the green detector 2b can also serve as an UV power monitor. Also, advantageously, an equivalent UV output value can be detected from the green detector even when the locking control section 2c (see FIG. 1) is not locking, that is, when the UV output cannot be obtained.

D. Method of Controlling Laser Light Source Apparatus

Figure 11:
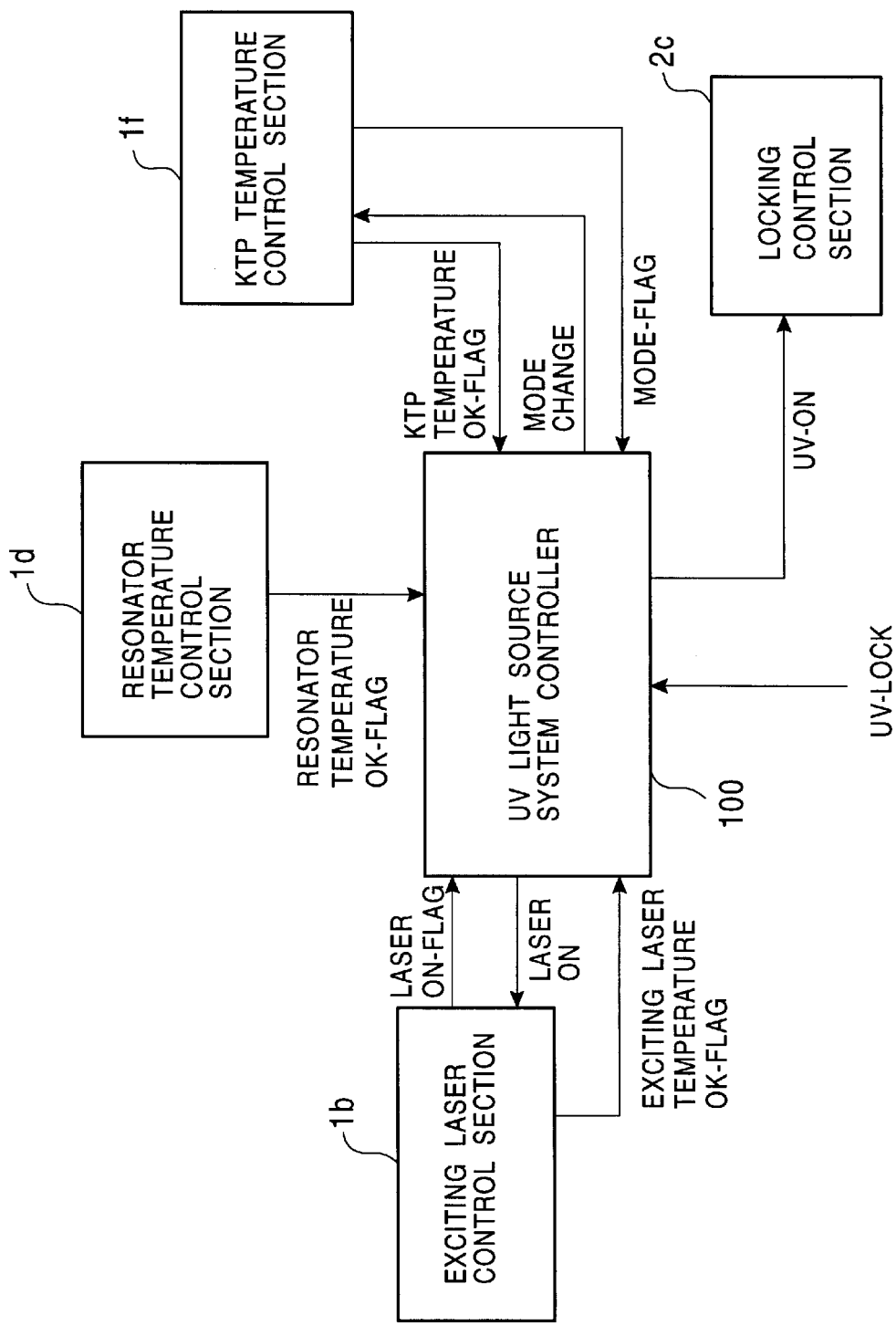
FIG. 11 is a block diagram of a UV light source system controller 100 using the optimal KTP temperature automatic setting method and the optimal KTP crystal temperature follow-up method.

A method of efficiently and optimally controlling the entire laser light source system shown in FIG. 1 will next be described with reference to FIG. 11. A controller 100 shown in FIG. 11 having a central processing unit (CPU), a read-only memory (ROM) and a random access memory (RAM) controls the exciting laser control section 1b, the resonator temperature control section 1d, the KTP temperature control section 1f and the locking control section 2c in accordance with the process shown by the flowchart of FIG. 12.

Figure 12:
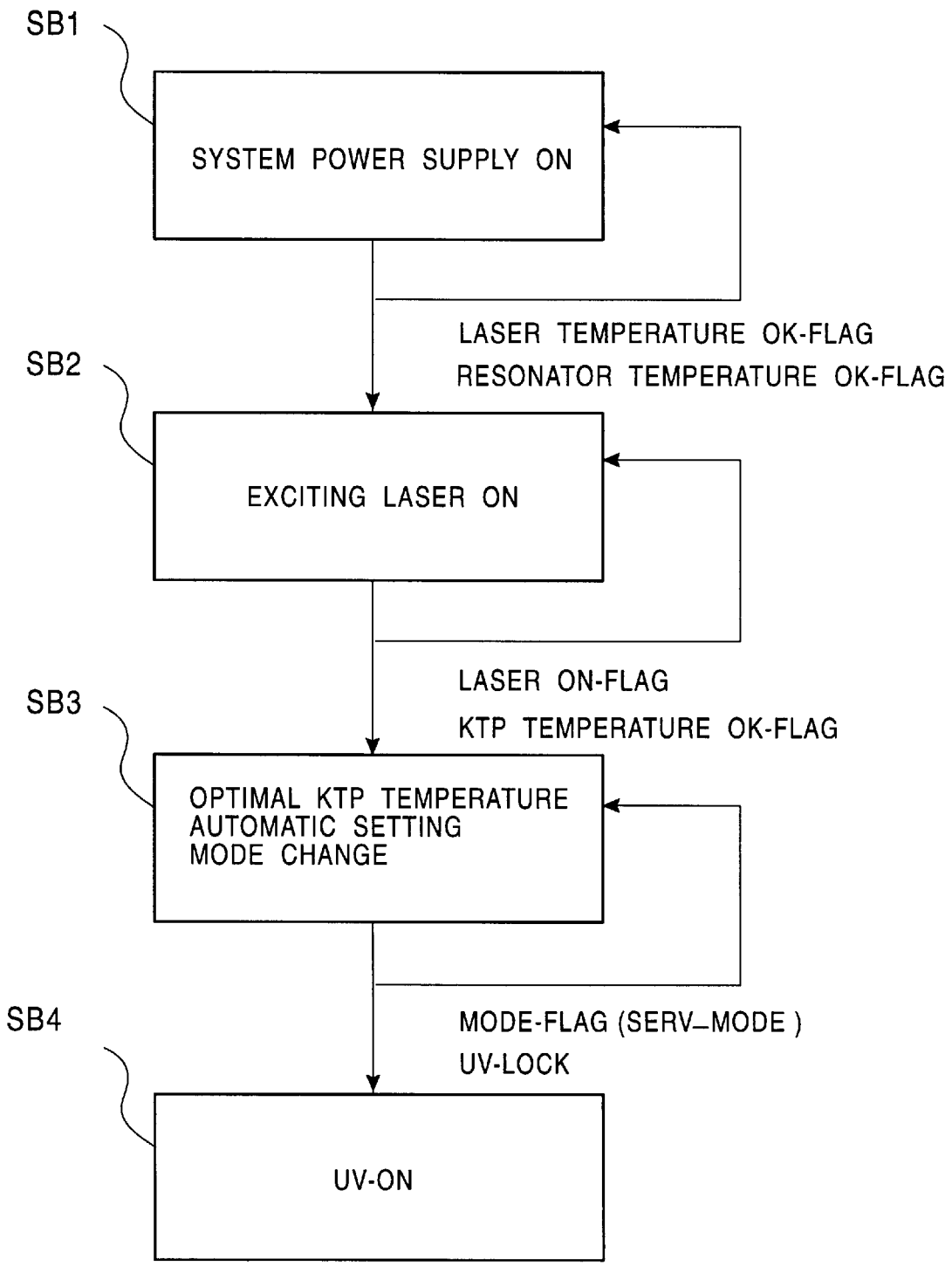
FIG. 12 is a flowchart of the operation of the UV light source system controller 100 shown in FIG. 11.

As shown in FIG. 12, when the power supply is turned on in step SB1, the controller 100 initializes the system and is supplied with a resonator temperature OK FLAG signal and a laser temperature OK FLAG signal each indicating completion of temperature setting from the resonator temperature control section 1d and the exciting laser control section 1b, respectively. Next, in step SB2, the controller 100 supplies a laser ON signal to the exciting laser control section 1b, thereby instructing this section to start laser oscillation.

Then, the controller 100 is supplied with laser ON FLAG signal from the exciting laser control unit 1b according to oscillation of exciting laser light and also supplied with a KTP temperature OK FLAG signal from the KTP temperature control section 1f, which signal indicates that the temperature of the KTP crystal has become equal to the temperature Ta corresponding to the reference potential REF.

In step SB3, the optimum temperature is searched for by the above-described optimal KTP crystal temperature automatic setting method, and the above-described processings in mode SET_MODE (step SA2), mode ΔT_MODE (step SA3), mode Δt_MODE (step SA4) and mode SERV_MODE (step SA5) are executed, thereby performing optimal KTP temperature control. If an external UV laser oscillation signal (UV_LOCK) is supplied at this stage, the process advances to step SB4 to output UV laser light.

According to the present invention, as described above, a predetermined temperature step ΔT is periodically added to the temperature Ta corresponding to the reference potential REF, addition of temperature step ΔT is stopped when the UV laser output is substantially maximized, and a temperature step Δt smaller than the temperature step ΔT is successively subtracted from the temperature Tc, thus making it possible to automatically set the KTP crystal temperature to the optimal temperature.

Also, the difference between the two values of the UV laser output before and after one step of addition of temperature step ΔT is calculated and step subtraction is started when the difference becomes reversed in polarity, thus controlling the KTP crystal temperature so that the UV laser output is always at the maximum. Therefore, the control system can follow up a variation in the optimal temperature due to a change in the temperature characteristic of the KTP crystal.

The entire laser light source system is controlled by using the above-described optimal KTP crystal temperature automatic setting method and optimal KTP crystal temperature follow-up method. The entire system of the light source apparatus can therefore be controlled efficiently and optimally. As a result, the resonator can resonate stably to produce a high UV laser light output.

What is claimed is:

1. A laser light source apparatus, comprising:

a solid state laser for emitting a fundamental-wave laser light;

a first resonator unit for wavelength-converting, with a nonlinear optical crystal, the fundamental-wave laser light emitted from the solid state laser to emit a second harmonic light;

a second resonator unit for wavelength-converting the second harmonic light emitted from the first resonator unit to emit a fourth harmonic light which is the fourth harmonic of the fundamental wave;

feedback control means for controlling the temperature of the nonlinear optical crystal according to measured values of the temperature of the nonlinear optical crystal and a temperature command value, said temperature command value determined in accordance with said measured values of the temperature of the nonlinear optical crystal;

detection means for detecting an optimal temperature of the nonlinear optical crystal; and variation follow-up means for supplying said temperature command value to said feedback control means to provide follow up variation in the optimal temperature obtained by said detection means.

2. The laser light source apparatus according to claim 1, wherein said detection means periodically adds a predetermined temperature step ΔT to a temperature Ta, stops addition of the temperature step ΔT at a temperature Tc (Ta<Tc) at which the fourth harmonic light output is substantially maximized, and subtracts a temperature step Δt smaller than the temperature step ΔT from the temperature Tc to detect an optimal temperature at which the fourth harmonic light output is substantially maximized again.

3. A laser light source apparatus according to claim 1, wherein mid variation follow-up means calculates the difference between the two values of the fourth harmonic light output before and after each step addition of the temperature step ΔT, and generates said temperature command value to start step-subtraction for maintaining the peak of the fourth harmonic light output when the difference becomes reversed in polarity.

4. A method of controlling a laser light source apparatus, said method comprising the steps of:

first step of wavelength-converting, with a nonlinear optical crystal, a fundamental-wave laser light emitted by a solid state laser to emit a second harmonic light;

a second step of wavelength-converting the second harmonic light emitted by said first step to emit a fourth harmonic light which is the fourth harmonic of the fundamental wave;

controlling the temperature of the nonlinear optical crystal according to measured values of the temperature of the nonlinear optical crystal and a temperature command value, said temperature command value determined in accordance with said measured values of the temperature of the nonlinear optical crystal;

detecting an optimal temperature of the nonlinear optical crystal; and supplying said temperature command value to said feedback control step to provide follow up variation in the optimal temperature obtained by said detection step.

5. The method according to claim 4, wherein, in said detection step, a predetermined temperature step $\Delta T$ is periodically added to a temperature Ta, the addition of the temperature step $\Delta T$ is stopped at a temperature Tc (Ta<Tc) at which the fourth harmonic light output is substantially maximized, and a temperature step $\Delta t$ smaller than the temperature step $\Delta T$ is subtracted from the temperature Tc to detect an optimal temperature at which the fourth harmonic light output is substantially maximized again.

6. The method according to claim 4, wherein, in said variation follow-up step, the difference between the two values of the fourth harmonic light output before and after each step addition of the temperature step $\Delta T$ is calculated and a temperature command value for starting step-subtraction and maintaining the peak of the fourth harmonic light output generated when the difference becomes reversed in polarity.

* * * * *